United States Patent
Huang et al.

(10) Patent No.: US 12,401,208 B2
(45) Date of Patent: **\*Aug. 26, 2025**

(54) METHOD FOR CHARGING POWER BATTERY AND BATTERY MANAGEMENT SYSTEM

(71) Applicant: CONTEMPORARY AMPEREX TECHNOLOGY (HONG KONG) LIMITED, Hong Kong (CN)

(72) Inventors: Shan Huang, Fujian (CN); Guangyu Xu, Fujian (CN); Haili Li, Fujian (CN); Shichao Li, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 170 days.

This patent is subject to a terminal disclaimer.

(21) Appl. No.: 18/209,491

(22) Filed: Jun. 14, 2023

(65) Prior Publication Data
US 2023/0327464 A1    Oct. 12, 2023

Related U.S. Application Data

(63) Continuation of application No. PCT/CN2021/133266, filed on Nov. 25, 2021.

(51) Int. Cl.
*H02J 7/00* (2006.01)
*H02J 7/14* (2006.01)

(52) U.S. Cl.
CPC ........... *H02J 7/0029* (2013.01); *H02J 7/0048* (2020.01); *H02J 7/005* (2020.01); *H02J 7/007194* (2020.01)

(58) Field of Classification Search
CPC .. H02J 7/0029; H02J 7/007194; H02J 7/0048; H02J 7/005
(Continued)

(56) References Cited

U.S. PATENT DOCUMENTS 8,598,838 B2 * 12/2013 Cunico ................... B60L 8/006
    320/101
9,882,406 B2    1/2018 Satou et al.
(Continued)

FOREIGN PATENT DOCUMENTS

| CN | 106450536 A | 2/2017 |
| CN | 106450537 A | 2/2017 |

(Continued)

OTHER PUBLICATIONS

International Search Report and Written Opinion mailed on Aug. 10, 2022, received for PCT Application PCT/CN2021/133266, filed on Nov. 25, 2021, 13 pages including English Translation.
(Continued)

*Primary Examiner* — Alexis B Pacheco
(74) *Attorney, Agent, or Firm* — XSENSUS LLP

(57) ABSTRACT

Embodiments of the present application provide a method for charging a power battery and a battery management system. The method may be applied to a battery management system for the power battery, and the method may comprise acquiring a charging mode of the power battery; determining a negative electrode potential safety threshold for the power battery according to the charging mode of the power battery; acquiring a negative electrode potential of the power battery during a charging process for the power battery; and adjusting a charging current for the power battery based on the negative electrode potential of the power battery and the negative electrode potential safety threshold.

16 Claims, 4 Drawing Sheets

(58) Field of Classification Search
USPC .......................................................... 320/134
See application file for complete search history.

(56) References Cited

U.S. PATENT DOCUMENTS

| | | | | |
|---|---|---|---|---|
| 2011/0127958 | A1* | 6/2011 | Ishishita | ............... B60W 10/06 |
| | | | | 320/109 |
| 2016/0072313 | A1* | 3/2016 | Satou | .................... H01M 10/44 |
| | | | | 320/162 |
| 2018/0123354 | A1 | 5/2018 | Lim et al. | |
| 2019/0162771 | A1* | 5/2019 | Miyazawa | ........... G01R 31/385 |
| 2021/0210971 | A1 | 7/2021 | Lim et al. | |
| 2021/0323429 | A1* | 10/2021 | Fata | ........................ B60L 53/12 |
| 2022/0120815 | A1* | 4/2022 | Wei | .................... G01R 31/3648 |
| 2023/0062270 | A1* | 3/2023 | Li | ........................ H01M 10/615 |
| 2023/0305070 | A1* | 9/2023 | Campbell | ............. H01M 10/44 |
| 2023/0327464 | A1* | 10/2023 | Huang | ................. H02J 7/00309 |
| | | | | 320/150 |
| 2023/0335822 | A1* | 10/2023 | Huang | ................. H01M 10/425 |
| 2024/0022092 | A1* | 1/2024 | Huang | .................. H02J 7/0047 |

FOREIGN PATENT DOCUMENTS

| | | |
|---|---|---|
| CN | 110061315 A | 7/2019 |
| CN | 111740457 A | 10/2020 |
| CN | 112615075 A | 4/2021 |
| CN | 113162195 A | 7/2021 |
| CN | 113178927 A | 7/2021 |
| CN | 112615075 B | 11/2021 |
| JP | 2016-091802 A | 5/2016 |
| JP | 2016-144385 A | 8/2016 |
| JP | 2020-077464 A | 5/2020 |
| JP | 2020-162216 A | 10/2020 |

OTHER PUBLICATIONS

Extended European Search Report issued Apr. 8, 2024 in European Patent Application No. 21965149.4.
Office Action issued Jun. 24, 2024 in Japanese Patent Application No. 2023-542000 with English translation thereof.
Office Action issued Feb. 26, 2025 in European Patent Application No. 21 965 149.4.

* cited by examiner

METHOD FOR CHARGING POWER BATTERY AND BATTERY MANAGEMENT SYSTEM

CROSS-REFERENCE TO RELATED APPLICATION

The present application is a continuation of International Application No. PCT/CN2021/133266, filed Nov. 25, 2021, which is incorporated herein by reference in its entirety.

TECHNICAL FIELD

The present application relates to the field of power batteries, and in particular to a method for charging a power battery and a battery management system.

BACKGROUND

With the development of the times, electric vehicles, due to their high environmental protection, low noise, low cost of use and other advantages, have a huge market prospect and can effectively promote energy saving and emission reduction, which is beneficial to the development and progress of society.

For electric vehicles and their related fields, the battery technology is an important factor in their development, especially the safety performance of batteries, which not only affects the development and application of power battery-related products, but also affects the consumers' acceptance of electric vehicles. In addition, the users may have different charging requirements for electric vehicles under different charging scenarios. Therefore, how to balance the safety performance of batteries and different requirements of users is an urgent problem to be solved.

SUMMARY OF THE DISCLOSURE

Embodiments of the present application provide a method for charging a power battery and a battery management system, which can meet the charging requirements of users in different charging scenarios on the basis of ensuring the safety performance of the power battery.

In a first aspect, a method for charging a power battery is provided, which is applied to a battery management system for the power battery, the method comprising: acquiring a charging mode of the power battery; determining a negative electrode potential safety threshold for the power battery according to the charging mode of the power battery; acquiring a negative electrode potential of the power battery during a charging process for the power battery; and adjusting a charging current for the power battery based on the negative electrode potential of the power battery and the negative electrode potential safety threshold.

In the above technical solution, on the one hand, since normally the charging mode of the power battery is the charging mode selected by the user according to his or her own requirements in the current charging scenario, adjusting the charging current according to the negative electrode potential safety threshold determined by the charging mode can meet the charging requirements of users in different charging scenarios; on the other hand, adjusting the charging current for the power battery according to the negative electrode potential of the power battery and the negative electrode potential safety threshold can avoid the safety problem of the power battery caused by lithium ion aggregation and other problems, such as battery combustion or explosion, thus ensuring the safety performance of the power battery. Further, the above technical solution is implemented by software, that is, the purpose of ensuring the safety performance of the power battery and meeting the charging requirements of the user under different charging scenarios is achieved without increasing the hardware cost of the BMS.

In some possible implementations, said determining a negative electrode potential safety threshold for the power battery according to the charging mode of the power battery comprises: determining the negative electrode potential safety threshold for the power battery according to the charging mode of the power battery and according to the correspondence between charging modes and negative electrode potential safety thresholds.

In the above technical solution, the negative electrode potential safety threshold is determined according to the correspondence between charging modes and negative electrode potential safety thresholds, which is not only simple to implement but also less time consuming.

In some possible implementations, the charging mode comprises at least a first charging mode or a second charging mode, wherein in the first charging mode, the charging current for the power battery is a first charging current, and in the second charging mode, the charging current for the power battery is a second charging current, the first charging current being greater than the second charging current, and the negative electrode potential safety threshold corresponding to the first charging mode being less than the negative electrode potential safety threshold corresponding to the second charging mode.

When the charging mode of the power battery is a charging mode with a higher charging current, which indicates that the user expects that the power battery can be charged to the expected level or even fully in a short period of time, the above technical solution sets the negative electrode potential safety threshold corresponding to this charging mode to be small, which can avoid the problem that the BMS adjusts the charging current to be smaller when the negative electrode potential drops not too small, so as not to affect the charging current and charging duration of the power battery. When the charging mode of the power battery is a charging mode with a smaller charging current, which indicates that the user has a lower requirement for the charging speed and a higher requirement for the safety performance of the power battery, the above technical solution sets the negative electrode potential safety threshold corresponding to this charging mode to be large, which can ensure the safety performance of the power battery.

In some possible implementations, said determining a negative electrode potential safety threshold for the power battery according to the charging mode of the power battery comprises: determining the negative electrode potential safety threshold according to the charging mode of the power battery and a battery state parameter of the power battery, the battery state parameter comprising at least one of the state of charge (SOC), the temperature, and the state of health (SOH) of the power battery.

In the above technical solution, since the risk level of lithium plating of the power battery is closely related to its own battery state parameter, the above technical solution determines the negative electrode potential safety threshold according to the battery state parameter of the power battery, so that the determined negative electrode potential safety threshold can be more accurate and closer to the critical potential of lithium plating of the power battery. In this way, adjusting the charging current for the power battery based on the determined negative electrode potential safety threshold and the negative electrode potential of the power battery can more effectively ensure the safety performance of the power battery.

In some possible implementations, the battery state parameter of the power battery is a battery state parameter of the power battery before charging.

In some possible implementations, in the same charging mode, when the SOC of the power battery is in a first SOC interval, the negative electrode potential safety threshold is a first preset negative electrode potential safety threshold; and when the SOC of the power battery is in a second SOC interval, the negative electrode potential safety threshold is a second preset negative electrode potential safety threshold, wherein SOCs in the first SOC interval are less than SOCs in the second SOC interval, and the first preset negative electrode potential safety threshold is less than the second preset negative electrode potential safety threshold.

Since the larger the SOC of the power battery, the higher the risk of lithium plating of the power battery, on the one hand, the negative electrode potential safety threshold corresponding to the power battery with high risk of lithium plating is set relatively large, which can effectively suppress the risk of lithium plating of the power battery and thus improve the safety performance of the power battery; on the other hand, the above technical solution sets the negative electrode potential safety threshold corresponding to the power battery with low risk of lithium plating to be relatively small, which can ensure the charging speed of the power battery without affecting the safety performance of the power battery.

In some possible implementations, in the same charging mode, when the temperature of the power battery is in a first temperature interval, the negative electrode potential safety threshold is a third preset negative electrode potential safety threshold; and when the temperature of the power battery is in a second temperature interval, the negative electrode potential safety threshold is a fourth preset negative electrode potential safety threshold, wherein temperatures in the first temperature interval are less than temperatures in the second temperature interval, and the third preset negative electrode potential safety threshold is greater than the fourth preset negative electrode potential safety threshold.

Since the lower the temperature of the power battery, the higher the risk of lithium plating of the power battery, on the one hand, the negative electrode potential safety threshold corresponding to the power battery with high risk of lithium plating is set relatively large, which can effectively suppress the risk of lithium plating of the power battery and thus improve the safety performance of the power battery; on the other hand, the above technical solution sets the negative electrode potential safety threshold corresponding to the power battery with low risk of lithium plating to be relatively small, which can ensure the charging speed of the power battery without affecting the safety performance of the power battery.

In some possible implementations, in the same charging mode, when the SOH of the power battery is in a first SOH interval, the negative electrode potential safety threshold is a fifth preset negative electrode potential safety threshold; and when the SOH of the power battery is in a second SOH interval, the negative electrode potential safety threshold is a sixth preset negative electrode potential safety threshold, wherein SOHs in the first SOH interval are less than SOHs in the second SOH interval, and the fifth preset negative electrode potential safety threshold is greater than the sixth preset negative electrode potential safety threshold.

Since the smaller the SOH of the power battery, the higher the risk of lithium plating of the power battery, on the one hand, the negative electrode potential safety threshold corresponding to the power battery with high risk of lithium plating is set relatively large, which can effectively suppress the risk of lithium plating of the power battery and thus improve the safety performance of the power battery; on the other hand, the above technical solution sets the negative electrode potential safety threshold corresponding to the power battery with low risk of lithium plating to be relatively small, which can ensure the charging speed of the power battery without affecting the safety performance of the power battery.

In some possible implementations, said adjusting a charging current for the power battery based on the negative electrode potential of the power battery and the negative electrode potential safety threshold comprises: adjusting the charging current from a first charging current to a second charging current if the negative electrode potential drops to the negative electrode potential safety threshold, the second charging current being less than the first charging current.

In the above technical solution, when the negative electrode potential of the power battery drops to the negative electrode potential safety threshold, it indicates that this power battery may be about to experience lithium plating, and reducing the charging current for the power battery in this case can avoid the safety problem of the power battery caused by lithium ion aggregation and other problems, such as battery combustion or explosion, thus ensuring the safety performance of the power battery.

In some possible implementations, said adjusting a charging current for the power battery based on the negative electrode potential of the power battery and the negative electrode potential safety threshold comprises: adjusting the charging current from a first charging current to a third charging current if the negative electrode potential does not drop to the negative electrode potential safety threshold and a charging duration of the power battery is greater than a time threshold, the third charging current being greater than the first charging current.

In the above technical solution, if the negative electrode potential of the power battery does not drop to the negative electrode potential safety threshold for a long time, it indicates that the charging current for the power battery for the current moment is too small. Increasing the charging current for the power battery in this case can increase the charging speed and greatly reduce the charging duration of the power battery, thereby improving the user experience.

In a second aspect, a battery management system for a power battery is provided, comprising: circuitry configured to acquire a charging mode of the power battery; determine a negative electrode potential safety threshold for the power battery according to the charging mode of the power battery; acquire a negative electrode potential of the power battery during a charging process for the power battery; and adjust a charging current for the power battery based on the negative electrode potential of the power battery and the negative electrode potential safety threshold.

In some possible implementations, the circuitry is further configured to determine the negative electrode potential safety threshold for the power battery according to the charging mode of the power battery and according to the correspondence between charging modes and negative electrode potential safety thresholds.

In some possible implementations, the charging mode comprises at least a first charging mode or a second charging mode, wherein in the first charging mode, the charging current for the power battery is a first charging current, and in the second charging mode, the charging current for the power battery is a second charging current, the first charging current being greater than the second charging current, and the negative electrode potential safety threshold corresponding to the first charging mode being less than the negative electrode potential safety threshold corresponding to the second charging mode.

In some possible implementations, the circuitry is further configured to determine the negative electrode potential safety threshold according to the charging mode of the power battery and a battery state parameter of the power battery, the battery state parameter comprising at least one of the state of charge (SOC), the temperature, and the state of health (SOH) of the power battery.

In some possible implementations, the battery state parameter of the power battery is a battery state parameter of the power battery before charging.

In some possible implementations, in the same charging mode, when the SOC of the power battery is in a first SOC interval, the negative electrode potential safety threshold is a first preset negative electrode potential safety threshold; and when the SOC of the power battery is in a second SOC interval, the negative electrode potential safety threshold is a second preset negative electrode potential safety threshold, wherein SOCs in the first SOC interval are less than SOCs in the second SOC interval, and the first preset negative electrode potential safety threshold is less than the second preset negative electrode potential safety threshold.

In some possible implementations, in the same charging mode, when the temperature of the power battery is in a first temperature interval, the negative electrode potential safety threshold is a third preset negative electrode potential safety threshold; and when the temperature of the power battery is in a second temperature interval, the negative electrode potential safety threshold is a fourth preset negative electrode potential safety threshold, wherein temperatures in the first temperature interval are less than temperatures in the second temperature interval, and the third preset negative electrode potential safety threshold is greater than the fourth preset negative electrode potential safety threshold.

In some possible implementations, in the same charging mode, when the SOH of the power battery is in a first SOH interval, the negative electrode potential safety threshold is a fifth preset negative electrode potential safety threshold; and when the SOH of the power battery is in a second SOH interval, the negative electrode potential safety threshold is a sixth preset negative electrode potential safety threshold, wherein SOHs in the first SOH interval are less than SOHs in the second SOH interval, and the fifth preset negative electrode potential safety threshold is greater than the sixth preset negative electrode potential safety threshold.

In some possible implementations, the circuitry is further configured to adjust the charging current from a first charging current to a second charging current if the negative electrode potential drops to the negative electrode potential safety threshold, the second charging current being less than the first charging current.

In some possible implementations, the circuitry is further configured to adjust the charging current from a first charging current to a third charging current if the negative electrode potential does not drop to the negative electrode potential safety threshold and a charging duration of the power battery is greater than a time threshold, the third charging current being greater than the first charging current.

In a third aspect, a battery management system (BMS) for a power battery is provided, comprising: a memory for storing a program; and a processor for executing the program stored in the memory, wherein the program stored in the memory is executed, the processor is used to execute the method in the first aspect above or in each of its implementations.

BRIEF DESCRIPTION OF DRAWINGS

In order to more clearly illustrate the technical solutions of embodiments of the present application, the following is a brief description of the accompanying drawings to be used in the embodiments of the present application. It is obvious that the accompanying drawings described below are only some embodiments of the present application, and other accompanying drawings can be obtained according to the accompanying drawings without any creative work for a person of ordinary skill in the art.

DETAILED DESCRIPTION

Embodiments of the present application will be described in further detail hereinafter in conjunction with the accompanying drawings and embodiments. The following detailed description of the embodiments and the drawings are used to illustrate the principles of the present application by way of example, but should not be used to limit the scope of the present application, that is, the present application is not limited to the described embodiments.

In the description of the present application, it should be noted that, unless otherwise stated, "plurality of" means two or more; the orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first", "second" and "third" are only used for descriptive purposes, and cannot be construed as indicating or implying relative importance.

In the field of new energy, power batteries can be used as the main power source for electrical apparatuses (e.g., vehicles, ships or spacecraft, and so on). At present, the power batteries on the market are mostly rechargeable storage batteries, and the most common ones are lithium batteries, such as lithium-ion batteries or lithium-ion polymer batteries, and the like. In the charging process, the power battery is generally charged by means of continuous charging, and continuous charging of the power battery will cause the occurrence of lithium plating and heating of the power battery, among which, the lithium plating and heating will not only degrade the performance of the power battery and significantly shorten the cycle life, but also limit the fast charging capacity of the power battery and may cause disastrous consequences such as combustion and explosion, resulting in serious safety problems.

In addition, the users may have different charging requirements under different charging scenarios. For example, when the user is in a hurry to charge, his or her charging requirement for the battery may be more biased toward the charging speed; for another example, when the user is resting and charging at night, his requirement for the battery charging speed is obviously reduced, and he or she is more biased toward the charging safety.

In view of this, embodiments of the present application propose a method for charging a power battery, which can meet the charging requirements of users in different charging scenarios on the basis of ensuring the safety performance of the power battery.

Figure 1:
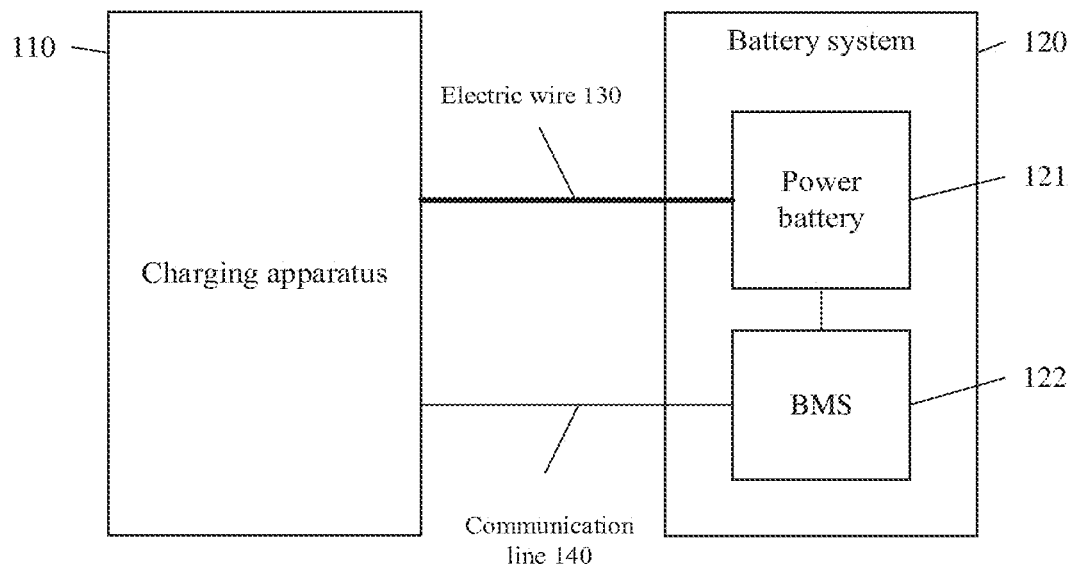
FIG. 1 is an architecture diagram of a charging system to which an embodiment of the present application applies.

FIG. 1 illustrates an architecture diagram of a charging system to which an embodiment of the present application applies. As shown in FIG. 1, the charging system 100 may include: a charging apparatus 110 and a battery system 120. Optionally, the battery system 120 may be a battery system in an electric vehicle (including all-electric vehicles and pluggable hybrid electric vehicles) or a battery system in other application scenarios.

Optionally, the battery system 120 may be provided with at least one battery pack, and the at least one battery pack as a whole may be collectively referred to as the power battery 121. In terms of the type of the battery, this power battery 121 may be any type of battery, including but not limited to: lithium-ion battery, lithium metal battery, lithium sulfur battery, lead acid battery, nickel cadmium battery, nickel metal hydride battery, or lithium air battery and the like. In terms of the scale of the battery, the power battery 121 in the embodiments of the present application may be a battery cell/cell, or a battery module or a battery pack, wherein the battery module or battery pack may be formed by multiple batteries connected in series and in parallel. In the embodiments of the present application, no specific limitation is imposed on the specific type and scale of the power battery 121.

In addition, in order to intelligently manage and maintain the power battery 121, to prevent the power battery 121 from overcharging and overdischarging, and to extend the service life of the battery, the battery system 120 is generally provided with a battery management system (BMS) 122 for implementing functions of charge and discharge management, high-voltage control, battery protection, battery data collection, battery state evaluation, and the like. Optionally, the BMS 122 may be integrated with the power battery 121 in the same device or apparatus, or the BMS 122 may be provided outside the power battery 121 as an independent device or apparatus.

The charging apparatus 110 can output charging power to charge the power battery 121 in accordance with the charging requirement of the BMS 122. For example, the charging apparatus 110 can output a voltage and a current in accordance with the required voltage and the required current sent by the BMS 122. Optionally, the charging apparatus 110 in embodiments of the present application may be a charging pile, also referred to as a charger. The charging pile here may be, for example, a normal charging pile, a super charging pile, a charging pile supporting a vehicle to grid (V2G) mode, or the like.

As shown in FIG. 1, the charging apparatus 110 may be connected to the power battery 121 via an electric wire 130 and to the BMS 122 via a communication line 140, where the communication line 140 is used to achieve information interaction between the charging apparatus 110 and the BMS. As an example, the communication line 140 includes, but is not limited to, a control area network (CAN) communication bus or a daisy chain communication bus.

The charging apparatus 110 may communicate with the BMS 122 via a wireless network in addition to communicating with the BMS 122 via the communication line 140. Embodiments of the present application do not specifically limit either the type of wired communication or the type of wireless communication between the charging apparatus 110 and the BMS 122.

Figure 2:
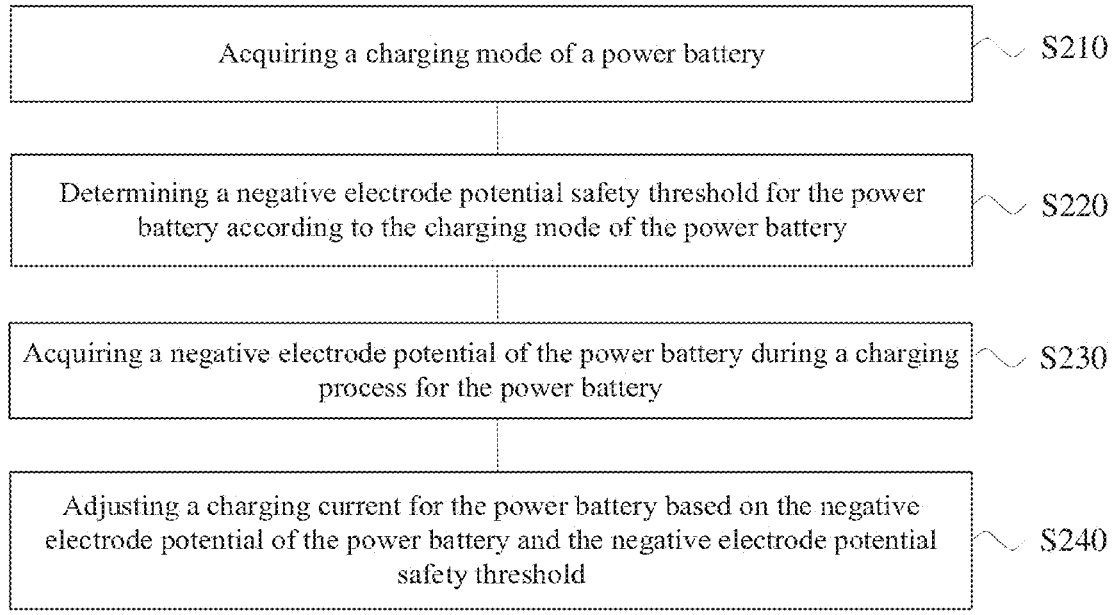
FIG. 2 is a schematic diagram of a method for charging a power battery of an embodiment of the present application.

FIG. 2 illustrates a schematic diagram of a method 200 for charging a power battery of an embodiment of the present application. The method 200 may be performed by a BMS, and the BMS may be, for example, the BMS 122 in FIG. 1. The method 200 may include at least some of the following contents.

Step S210: acquiring a charging mode of the power battery.

Step S220: determining a negative electrode potential safety threshold for the power battery according to the charging mode of the power battery.

Step S230: acquiring a negative electrode potential of the power battery during a charging process for the power battery.

Step S240: adjusting a charging current for the power battery based on the negative electrode potential of the power battery and the negative electrode potential safety threshold.

Here, the charging mode of the power battery may include, but is not limited to, the super-fast charging mode, the regular fast charging mode, the long-life charging mode, and so on. The super-fast charging mode is biased toward the requirement for the charging speed and typically has a higher charging current. In the case where the user is in a hurry to use the electrical apparatus including the power battery, the user will generally choose the super-fast charging mode. Compared to the super-fast charging mode, the regular fast charging mode does not have such a high requirement for the charging speed and can be interpreted as a charging mode that is a compromise between charging speed and charging safety. The long-life charging mode is biased toward the requirement for the charging safety and does not have a high requirement for the charging speed. Users generally choose the long-life charging mode when charging power batteries at night. It should be understood that the charging currents in the super-fast charging mode, the regular fast charging mode, and the long-life charging mode decreases in order and the charging durations increase in order.

Of course, the charging mode of the power battery may also include other charging modes, such as the fixed-duration and fixed-SOC mode, which is a charging mode that charges to a certain SOC within a specified duration and is biased toward the scheduling function.

The BMS acquiring the charging mode of the power battery may specifically be: the BMS receives the charging mode information sent by the charging pile, wherein the charging mode information is used for indicating the charging mode of the power battery. Specifically, after the user inserts the charging gun into the charging pile and selects the charging mode for this charging, the charging pile acquires the charging mode, so that the charging pile can send charging mode information to the BMS, the charging mode information being used to indicate the charging mode of the power battery. Accordingly, the BMS can receive the charging mode information.

Alternatively, the electrical apparatus including the power battery is provided with a human-computer interaction interface, such as a touch screen, through which the user can input the charging mode for that charging, and thus the BMS can acquire the charging mode.

Furthermore, the electrical apparatus including the power battery can be connected to the electronic device (such as a smart phone, a wearable device, etc.) of the user, and the user can select the charging mode for this charging through the electronic device, so that the BMS can acquire the charging mode through the electronic device connected to the electrical apparatus.

Optionally, the BMS can acquire the charging mode only once during the entire charging process. In other words, the charging mode is fixed during the whole charging process for the power battery.

Optionally, considering that the user may change the charging mode during the charging process, for example, the user selects the lone-life charging mode at the beginning of charging, and after charging for a period of time, the user may temporarily have an emergency and urgently need to use the electrical apparatus and then change the charging mode to the super-fast charging mode, so the BMS can acquire the charging mode several times during the charging process. Exemplarily, the BMS can acquire the charging mode periodically, for example, the BMS can acquire the charging mode every 5 s.

After the BMS acquires the charging mode, the BMS can determine the negative electrode potential safety threshold for the power battery according to this charging mode.

In general, during the charging process for the power battery, the negative electrode potential (or called the anode potential) of the power battery gradually drops, and when the negative electrode potential of the power battery drops to a certain potential, the lithium plating phenomenon may occur. In embodiments of the present application, the negative electrode potential safety threshold may be slightly higher than the negative electrode potential of the power battery when the lithium plating phenomenon occurs, that is, the difference between the negative electrode potential safety threshold and the negative electrode potential of the power battery when the lithium plating phenomenon occurs is within a preset range.

In an implementation, the BMS can determine the negative electrode potential safety threshold according to the acquired charging mode and according to the correspondence between charging modes and negative electrode potential safety thresholds.

Optionally, the correspondence between charging modes and negative electrode potential safety thresholds may be pre-configured on the BMS. For example, the correspondence between charging modes and negative electrode potential safety thresholds may be obtained from extensive experimental data, after which the correspondence may be configured on the BMS by the technician at the time the BMS leaves the factory.

By way of example and not limitation, the correspondence between charging modes and negative electrode potential safety thresholds may be pre-configured on the BMS in the form of a table or graph. In this way, the BMS can determine the charging mode by means of internal table look-up or internal graph look-up.

Optionally, the correspondence between charging modes and negative electrode potential safety thresholds may also be acquired by the BMS from other devices or from the cloud.

It should be understood that the correspondence between charging modes and negative electrode potential safety thresholds can be updated every preset time period, and the updated correspondence can be reconfigured on the BMS or stored on other devices or stored in the cloud, etc.

In the above technical solution, the negative electrode potential safety threshold is determined according to the correspondence between charging modes and negative electrode potential safety thresholds, which is not only simple to implement but also less time consuming.

Usually, the charging mode selected by the user is related to the current requirements of that user. For example, when the user selects the super-fast charging mode, it indicates that the user expects that the power battery can be charged to the expected level or even fully in a short period of time. In this case, the negative electrode potential safety threshold cannot be too high. If the negative electrode potential safety threshold is too high, the charging current for the power battery will be limited and the charging duration of the power battery will be prolonged, which is exactly the opposite to the user's requirements. For example, when a user selects the long-life charging mode, which indicates that the user may not use the electrical apparatus including the power battery for some time in the future, the user has a low requirement for the charging speed and instead cares more about the safety performance of the power battery. In this case, the negative electrode potential safety threshold cannot be too low. If the negative electrode potential safety threshold is too low, it may be possible that the negative electrode potential of the power battery has dropped to the critical potential for lithium plating, but it still has not dropped to the negative electrode potential safety threshold, which will affect the safety performance of the power battery.

Therefore, with other factors being the same, the charging mode with a higher charging current corresponds to a smaller negative electrode potential safety threshold.

In an implementation, the charging mode includes at least a first charging mode and a second charging mode, wherein in the first charging mode, the charging current for the power battery is a first charging current, and in the second charging mode, the charging current for the power battery is a second charging current, the first charging current being greater than the second charging current, and the negative electrode potential safety threshold corresponding to the first charging mode being less than the negative electrode potential safety threshold corresponding to the second charging mode. For example, the first charging mode is the super-fast charging mode, and the second charging mode is the regular fast charging mode, and under the same conditions, the specified negative electrode potential safety threshold corresponding to the super-fast charging mode is 8 mv, and the safety threshold corresponding to the regular fast charging mode is 12 mv.

As an example, the correspondence between charging modes and negative electrode potential safety thresholds can be shown in Table 1. Here, the negative electrode potential safety threshold is in millivolts (mv). The other factors in Table 1 are the state of health (SOH) of the power battery. The SOH can be used to indicate the aging state of the power battery, which can also be understood as the remaining life of the power battery. After a long period of operation, the performance of the power battery will continue to decay, so the remaining life will be shorter, that is, the SOH value will be smaller. The smaller the SOH, the higher the risk of lithium plating of the power battery.

TABLE 1

| | Charging Mode | | |
|---|---|---|---|
| SOH | Super-fast charging mode | Regular fast charging mode | Long-life charging mode |
| (95%, 100%] | 5 | 8 | 10 |
| (90%, 95%] | 8 | 12 | 15 |
| (85%, 90%] | 10 | 15 | 20 |
| (80%, 85%] | 12 | 18 | 25 |
| ... | ... | ... | ... |

As can be seen from Table 1, under the same SOH, the negative electrode potential safety thresholds corresponding to the super-fast charging mode, the regular fast charging mode, and the long-life charging mode increase in order. For example, when the SOH is in the range of (90%, 95%], the negative electrode potential safety threshold corresponding to the super-fast charging mode is 8 mv, the negative electrode potential safety threshold corresponding to the regular fast charging mode is 12 mv, and the negative electrode potential safety threshold corresponding to the long-life charging mode is 15 mv. Obviously, the negative electrode potential safety thresholds corresponding to the super-fast charging mode, the regular fast charging mode, and the long-life charging mode increase in order.

It should be understood that Table 1 is only an example, and the charging modes do not necessarily include only the super-fast charging mode, the regular fast charging mode, and the fixed-duration and fixed-SOC mode, and the negative electrode potential safety thresholds corresponding to the charging modes under the same SOH are not necessarily as shown in Table 1. It should also be understood that the correspondence between charging modes and negative electrode potential safety thresholds can be a linear relationship or a nonlinear relationship.

In another implementation, the BMS can determine the negative electrode potential safety threshold based on the charging mode of the power battery and the battery state parameter of the power battery.

Among them, the battery state parameter of the power battery may include, but is not limited to, the state of charge (SOC), the temperature, and the SOH of the power battery. The SOC can be used to indicate the remaining capacity of the power battery, which is numerically defined as the ratio of the current remaining capacity of the power battery to the total available capacity, and is commonly expressed as a percentage. Specifically, when SOC=100%, it means that the power battery is completely fully charged; and conversely, when SOC=0%, it means that the power battery is completely discharged.

In this technical solution, since the risk level of lithium plating of the power battery is closely related to its own battery state parameter, the above technical solution determines the negative electrode potential safety threshold according to the battery state parameter of the power battery, so that the determined negative electrode potential safety threshold can be more accurate and closer to the critical potential of lithium plating of the power battery. In this way, adjusting the charging current for the power battery based on the determined negative electrode potential safety threshold and the negative electrode potential of the power battery can more effectively ensure the safety performance of the power battery.

Optionally, the battery state parameter of the power battery may be the battery state parameter of the power battery before charging. That is, before the power battery is charged, the BMS acquires the battery state parameter of the power battery and determines the negative electrode potential safety threshold based on the battery state parameter. After that, during the whole charging process, the BMS no longer acquires the battery state parameter of the power battery, and the negative electrode potential safety threshold no longer changes.

Optionally, the battery state parameter of the power battery may be the battery state parameter of the power battery during the charging process. That is, during the charging process for the power battery, the BMS can acquire the battery state parameter of the power battery in real time. That is, the BMS can determine the negative electrode potential safety threshold in real time.

Here, the BMS can periodically acquire the battery state parameter of the power battery during the charging process for the power battery. For example, during the charging process for the power battery, the BMS can acquire the battery state parameter of the power battery every 5 s.

Alternatively, during the charging process for the power battery, the BMS can acquire the battery state parameter of the power battery once every time the battery state parameter of the power battery changes.

Since the battery state parameter of the power battery may be constantly changing during the charging process, in the above technical solution, the BMS determines the battery state parameter of the power battery during the charging process, so that the determined battery state parameter may be the parameter closest to the actual battery state parameter of the power battery for the current moment, thus making the negative electrode potential safety threshold determined by the BMS according to the latest battery state parameter of the power battery more accurate, which can further improve the charging speed of the battery effectively on the basis of ensuring the safety performance of the battery.

In embodiments of the present application, in the same charging mode, the higher the risk of lithium plating of the power battery, the higher the negative electrode potential safety threshold.

As an example, in the same charging mode, when the SOC of the power battery is in a first SOC interval, the negative electrode potential safety threshold is a first preset negative electrode potential safety threshold; and when the SOC of the power battery is in a second SOC interval, the negative electrode potential safety threshold is a second preset negative electrode potential safety threshold, where SOCs in the first SOC interval are less than SOCs in the second SOC interval, and the first preset negative electrode potential safety threshold is less than the second preset negative electrode potential safety threshold.

As another example, in the same charging mode, when the temperature of the power battery is in a first temperature interval, the negative electrode potential safety threshold is a third preset negative electrode potential safety threshold; and when the temperature of the power battery is in a second temperature interval, the negative electrode potential safety threshold is a fourth preset negative electrode potential safety threshold, wherein temperatures in the first temperature interval are less than temperatures in the second temperature interval, and the third preset negative electrode potential safety threshold is greater than the fourth preset negative electrode potential safety threshold.

As another example, in the same charging mode, when the SOH of the power battery is in a first SOH interval, the negative electrode potential safety threshold is a fifth preset negative electrode potential safety threshold; and when the SOH of the power battery is in a second SOH interval, the negative electrode potential safety threshold is a sixth preset negative electrode potential safety threshold. Here, SOHs in the first SOH interval are less than SOHs in the second SOH interval, and the fifth preset negative electrode potential safety threshold is greater than the sixth preset negative electrode potential safety threshold.

For example, with continued reference to Table 1, when the charging mode is the regular fast charging mode, the smaller the SOH of the power battery, the higher the negative electrode potential safety threshold.

In the above technical solution, the negative electrode potential safety threshold is set based on the degree of risk of lithium plating of the power battery. On the one hand, the negative electrode potential safety threshold corresponding to the power battery with high risk of lithium plating is set relatively large, which can effectively suppress the risk of lithium plating of the power battery and thus improve the safety performance of the power battery. On the other hand, the negative electrode potential safety threshold corresponding to the power battery with low risk of lithium plating is set relatively small, which can ensure the charging speed of the power battery without affecting the safety performance of the power battery.

In embodiments of the present application, no specific limitation is imposed on the specific implementation of step 230. For example, the BMS can estimate the negative electrode potential of the power battery by a negative electrode potential estimation model, or the BMS can obtain the negative electrode potential of the power battery by means of actual measurement of the three-electrode battery with a reference electrode.

In one embodiment, for a two-electrode battery, the BMS can acquire the negative electrode potential by separating the positive and negative electrodes of the battery using a negative electrode potential estimation model. Here, the negative electrode potential estimation model may be, for example, an equivalent circuit model, an electrochemical model, and an equivalent circuit and electrochemical coupled model.

In another embodiment, the BMS can also acquire the negative electrode potential of the power battery by collecting the negative electrode potential of a three-electrode battery with a reference electrode and the potential of the reference electrode, wherein the three-electrode battery means that in addition to including the positive and negative electrodes of a conventional two-electrode battery, a new reference electrode is added, which is, for example, a lithium metal reference electrode, a lithium alloy reference electrode, or a copper wire in situ lithium-plated reference electrode, and so on.

Specifically, a polarization equivalent model for the three-electrode battery can be established first, wherein this polarization equivalent model may include positive and negative parameters to reflect the external and internal characteristics of the three-electrode battery to facilitate accurate prediction of the negative electrode potential. Here, the polarization equivalent model may include a Rint model, a polarization first-order RC equivalent circuit model, a polarization second-order RC equivalent circuit model, and so on.

Figure 3:
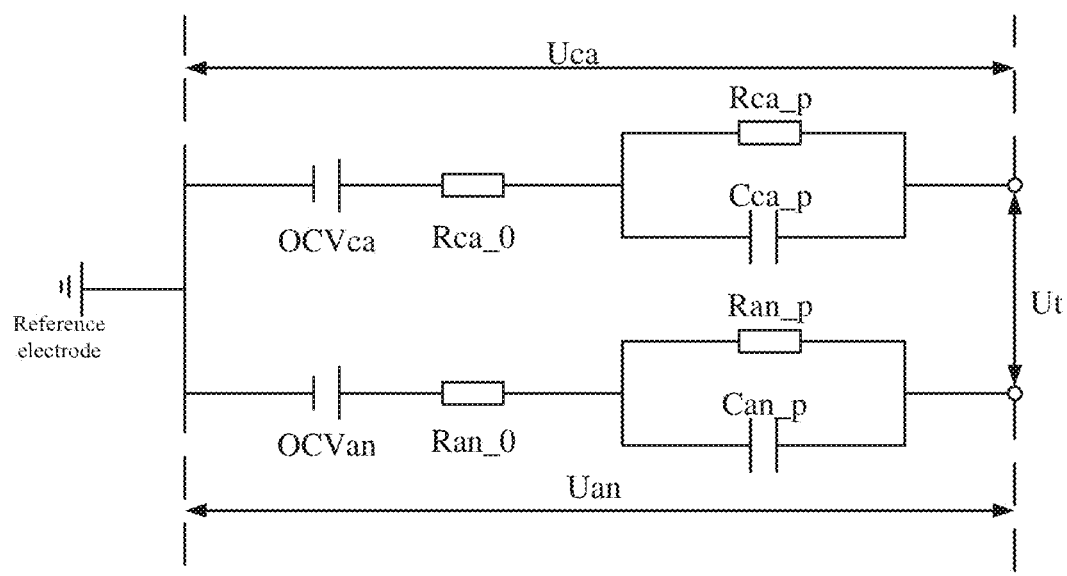
FIG. 3 is a schematic diagram of a polarization first-order RC equivalent circuit model of an embodiment of the present application.

FIG. 3 illustrates a schematic diagram of a polarization first-order RC equivalent circuit model of an embodiment of the present application. As shown in FIG. 3, Ut is the full battery terminal voltage; and Uca and Uan are the potential of the positive electrode relative to the reference electrode and the potential of the negative electrode relative to the reference electrode, respectively. OCVca and OCVan denote the open-circuit voltage of the positive electrode and the open-circuit voltage of the negative electrode, respectively; Rca_0 and Ran_0 denote the ohmic internal resistance of the positive electrode and the ohmic internal resistance of the negative electrode, respectively; Uca_p and Uan_p denote the polarization voltage of the positive electrode and the polarization voltage of the negative electrode, respectively; Rca_p and Ran_p denote the polarization internal resistance of the positive electrode and the polarization internal resistance of the negative electrode, respectively; Cca_p and Can_p denote the polarization capacitance of the positive electrode and the polarization capacitance of the negative electrode, respectively; and I denotes the current. Uca_p' and Uan_p' denote the derivatives of Uca_p and Uan_p, respectively.

First, the open-circuit voltage OCVca of the positive electrode and the open-circuit voltage OCVan of the negative electrode can be obtained from actual measurements, and then the model parameters Rca_0, Ran_0, Rca_p, Ran_p, Cca_p, and Can_p can be calibrated according to Equations (1)-(5) in combination with optimization algorithms, such as the least square method and genetic algorithms, and finally the negative electrode potential can be estimated using the extended Kalman filter algorithm, the proportional integral differential (PID) algorithm, or the Longaberger observer.

$$Ut = Uca - Uan \tag{1}$$

$$Uca = OCVca + I*Rca\_0 + Uca\_p \tag{2}$$

$$Uan = OCVan + I*Ran\_0 + Uan\_p \tag{3}$$

$$Uca\_p' = I/Cca\_p - Uca\_p/(Rca\_p*Cca\_p) \tag{4}$$

$$Uan\_p' = I/Can\_p - Uan\_p/(Ran\_p*Can\_p) \tag{5}$$

An embodiment for estimating the negative electrode potential using the extended Kalman filter algorithm will be briefly described below. The extended Kalman filter algorithm consists mainly of the state equation (6) and the observation equation (7), which are then combined with the recursion equations (8)-(12) to iteratively update the time and state so as to achieve state estimation.

$$X_{k+1} = A_k X_k + B_k U_k + Q_k \tag{6}$$

$$Y_k = C_k X_k + R_k \tag{7}$$

$$\hat{X}_k^- = A_{k-1} \hat{X}_{k-1} + B_{k-1} U_{k-1} \tag{8}$$

$$P_k^- = A_{k-1} P_{k-1} A_{k-1}^T + Q \tag{9}$$

$$K_k = P_k^- C_k^T (C_k P_k^- C_k^T + R)^{-1} \tag{10}$$

$$\hat{X}_k = \hat{X}_k^- + K_k (Y_k - C_k \hat{X}_k^- - D_k U_k) \tag{11}$$

$$P_k = (1 - K_k C_k) P_k^- \tag{12}$$

where X is the state quantity to be estimated, U is a controllable input quantity, Y is an output quantity, Q and R denote the systematic error and measurement error, respectively, the subscript k denotes the variable for the moment k, the subscript k−1 denotes the variable for the moment k−1, the subscript k+1 denotes the variable for the moment k+1, the superscript "^" denotes the estimated value, and the superscript T denotes the transpose operation on the matrix. P is the covariance matrix of the estimation error, for example, $P_k^-$ denotes the prior estimation covariance matrix for the moment k and $P_k$ denotes the posterior estimation covariance matrix for the moment k. A, B, C, and D are the coefficient matrices and $K_k$ is the Kalman gain.

The values of X, A, B, C, Q, and R are substituted into the above Equations:

$$X_k = \begin{bmatrix} SOC_k \\ Uan\_p_k \\ Uca\_p_k \\ Uan_k \end{bmatrix}$$

$$A_k = \begin{bmatrix} 1 & 0 & 0 & 0 \\ 0 & e^{-\left(\frac{dt}{Ran\_p*Can\_p}\right)} & 0 & 0 \\ 0 & 0 & e^{-\left(\frac{dt}{Rca\_p*Cca\_p}\right)} & 0 \\ d(OCVan_k)/d(SOC_k) & e^{-\left(\frac{dt}{Ran\_p*Can\_p}\right)} & 0 & 0 \end{bmatrix}$$

$$B_k = \begin{bmatrix} dt/(3600*Cap) \\ Ran\_p*\left(1 - e^{-\left(\frac{dt}{Ran\_p*Can\_p}\right)}\right) \\ Rca\_p*\left(1 - e^{-\left(\frac{dt}{Rca\_p*Cca\_p}\right)}\right) \\ Ran\_p*\left(1 - e^{-\left(\frac{dt}{Ran\_p*Can\_p}\right)}\right) + Ran\_0 \end{bmatrix}$$

$$C_k = \begin{bmatrix} d(OCVan_k + OCVca_k)/d(SOC_k) \\ 1 \\ 1 \\ 0 \end{bmatrix}$$

$$Q_k = \begin{bmatrix} 0 & 0 & 0 & 0 \\ 0 & 0 & 0 & 0 \\ 0 & 0 & 0 & 0 \\ 0 & 0 & 0 & 0 \end{bmatrix}$$

$$R_k = 0.01$$

That is, the negative electrode potential can be acquired by the negative electrode potential estimation equation:

$$Uan_k = \frac{d(OCVan_k)}{d(SOC_k)}*SOC_k + Uan\_p_k*e^{-\left(\frac{dt}{Ran\_p*Can\_p}\right)} + Ran\_p*\left(1 - e^{-\left(\frac{dt}{Ran\_p*Can\_p}\right)}\right) + Ran\_0.$$

In some embodiments, the BMS may determine the adjusted charging current through a predictive control algorithm. For example, the BMS may determine the adjusted charging current by a proportion integral differential (PID) control algorithm.

Specifically, the BMS may obtain the adjusted charging current by the following Equation:

$$I0_{k+1} = I0_k + \Delta I_k$$

$$\Delta I_k = k_p \Delta Uan_k + k_i \sum_{i=1}^{k} \Delta Uan_k + k_d(\Delta Uan_k - \Delta Uan_{k-1})$$

where $I0_{k+1}$ is the charging request current for the moment k+1, the adjusted charging current, $I0_k$ is the charging request current for the moment k, i.e., the charging current before adjustment, $\Delta Uan_k$ is the negative electrode potential safety threshold for the moment k, which may also be the negative electrode potential of the power battery for the moment k, $\Delta Uan_{k-1}$ is the negative electrode potential safety threshold for the moment k−1 or the negative electrode potential of the power battery for the moment k−1, and $k_p$, $k_i$, and $k_d$ are the proportional, integral, and differential parameters of the PID control algorithm, respectively. Exemplarily, $k_p$ may be 20, $k_i$ may be 5, and $k_d$ may be 70.

Optionally, the method 200 may also include: the BMS determines a first charging current and sends the first charging current to the charging pile. Specifically, the BMS may determine the first charging current according to parameters such as the temperature, the SOC, the SOH, and the voltage of the power battery. After the charging pile receives the first charging current, the charging pile can charge the power battery based on the first charging current.

Optionally, the first charging current may be carried in, but not limited to, the battery charging requirement (BCL) message.

After determining the negative electrode potential safety threshold and the negative electrode potential of the power battery, the BMS can adjust the charging current for the power battery during the charging process for the power battery based on the negative electrode potential of the power battery and the negative electrode potential safety threshold.

Optionally, the BMS can acquire the negative electrode potential of the power battery in real time and judge in real time whether the negative electrode potential of the power battery drops to the negative electrode potential safety threshold. For example, the BMS can periodically acquire the negative electrode potential of the power battery and periodically judge whether the negative electrode potential of the power battery drops to the negative electrode potential safety threshold.

Specifically, during the charging process, if the negative electrode potential of the power battery drops to the negative electrode potential safety threshold, the BMS can reduce the charging current for the power battery, that is, adjusting the charging current from the first charging current to a second charging current, the second charging current being less than the first charging current.

After adjusting the first charging current to the second charging current, the BMS can send the second charging current to the charging pile to enable the charging pile to charge the power battery based on the second charging current.

In the above technical solution, when the negative electrode potential of the power battery drops to the negative electrode potential safety threshold, it indicates that this power battery may be about to experience lithium plating, and reducing the charging current for the power battery in this case can avoid the safety problem of the power battery caused by lithium ion aggregation and other problems, such as battery combustion or explosion, thus ensuring the safety performance of the power battery.

Alternatively, if the negative electrode potential of the power battery does not drop to the negative electrode potential safety threshold and the charging duration of the power battery is greater than the time threshold, which indicates that the charging current for the current moment is small, then the BMS can increase the charging current for the power battery, that is, adjusting the charging current from the first charging current to a third charging current, the third charging current being greater than the first charging current.

Optionally, when the BMS sends the first charging current to the charging pile, the BMS can start a timer of which the timing duration is the time threshold. After the timer times out, it indicates that the charging duration of the power battery is greater than the time threshold.

Optionally, the time threshold may be, but is not limited to, 30s.

After adjusting the first charging current to the third charging current, the BMS can send the third charging current to the charging pile to enable the charging pile to charge the power battery based on the third charging current.

In the above technical solution, if the negative electrode potential of the power battery does not drop to the negative electrode potential safety threshold for a long time, it indicates that the charging current for the power battery for the current moment is too small. Increasing the charging current for the power battery in this case can increase the charging speed and greatly reduce the charging duration of the power battery, thereby improving the user experience.

Alternatively, if the negative electrode potential of the power battery does not drop to the negative electrode potential safety threshold and the charging duration of the power battery is less than the time threshold, the charging current for the power battery remains unchanged and the BMS can continue to send the first charging current to the charging pile, or the BMS can continue to acquire the negative electrode potential of the power battery to compare the negative electrode potential with the negative electrode potential safety threshold.

It should be understood that, after the BMS adjusts the charging current for the power battery, the BMS can continue to restart the timing.

It should also be understood that in embodiments of the present application, "first", "second", and "third" are used only to distinguish different objects, but do not limit the scope of embodiments of the present application.

Figure 4:
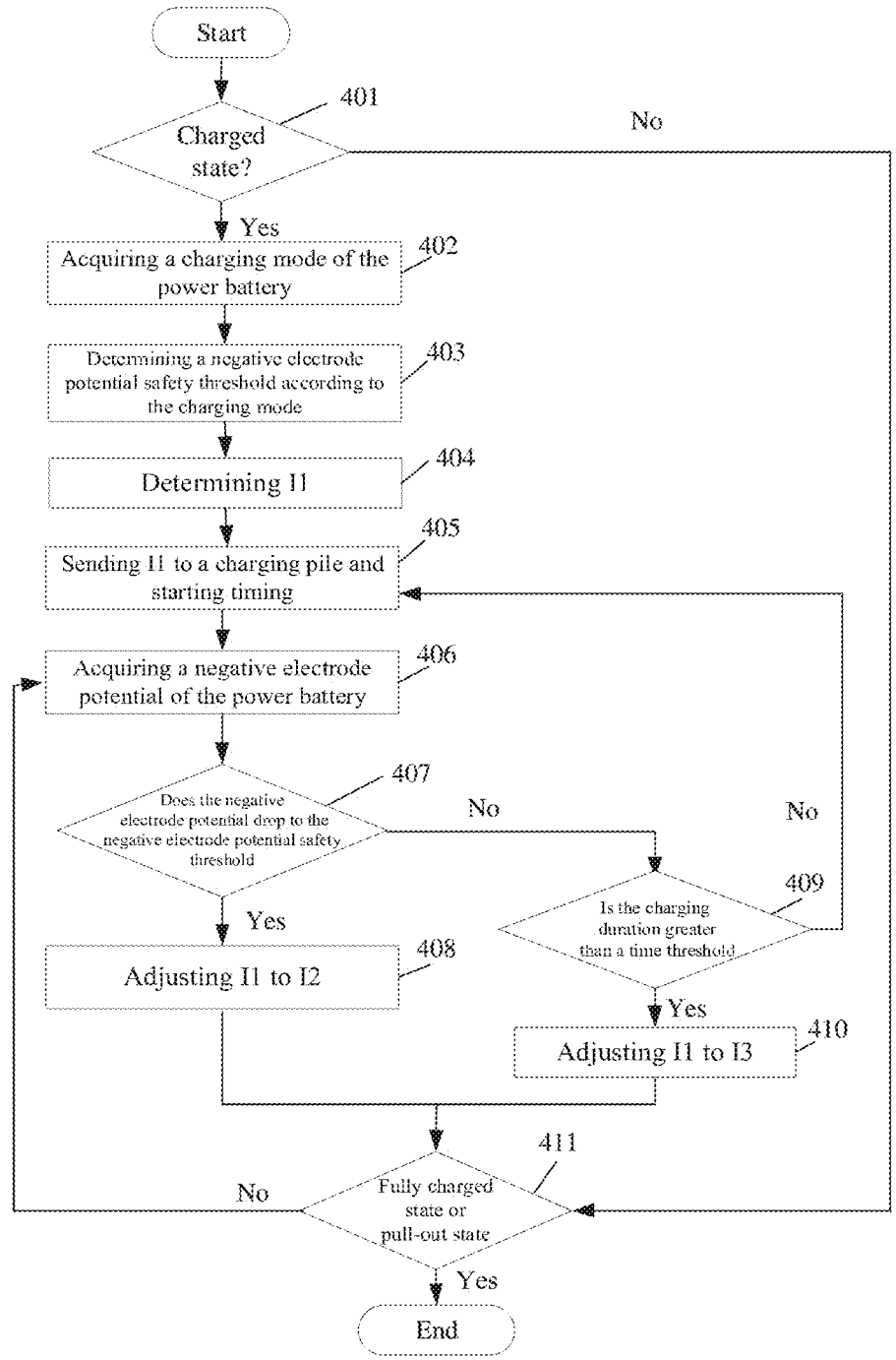
FIG. 4 is a schematic flowchart of a method for charging a power battery of an embodiment of the present application.

To more clearly understand the method 200 for charging a power battery of embodiments of the present application, a method for charging a power battery of a possible embodiment of the present application is described below in conjunction with FIG. 4.

In step 401, the BMS judges whether the power battery is in a charged state.

If the power battery is in the charged state, step 402 is executed; and if the power battery is not in the charged state, step 411 is executed.

In step 402, the BMS acquires a charging mode of the power battery.

In step 403, the BMS determines a negative electrode potential safety threshold for the power battery according to the charging mode of the power battery.

In step 404, the BMS determines a first charging current I1 for the power battery.

Specifically, the BMS may first acquire parameters such as the SOC, the SOH, the temperature, and the voltage of the power battery, and determine I1 based on parameters such as the SOC, the SOH, the temperature, and the voltage of the power battery.

In step 405, the BMS sends the first charging current I1 to a charging pile to request charging and starts timing.

In step 406, the BMS acquires a negative electrode potential of the power battery.

In step 407, the BMS compares the negative electrode potential of the power battery with the negative electrode potential safety threshold and judges whether the negative electrode potential of the power battery drops to the negative electrode potential safety threshold.

If the negative electrode potential of the power battery drops to the negative electrode potential safety threshold, step 408 is executed; and if the negative electrode potential safety threshold for the power battery does not drop to the negative electrode potential safety threshold, step 409 is executed.

In step 408, the BMS adjusts the first charging current I1 to a second charging current I2 and sends the second charging current I2 to the charging pile to enable the charging pile to charge the power battery based on I2.

In step 409, the BMS judges whether a charging duration of the power battery is greater than a time threshold.

If the charging duration is greater than the time threshold, the BMS executes step 410; and if the charging duration is less than the time threshold, the BMS executes step 405.

In step 410, the BMS adjusts the first charging current I1 to a third charging current I3 and sends the third charging current I3 to the charging pile to enable the charging pile to charge the power battery based on I3.

In step 411, the BMS judges whether the power battery is in a fully charged state or a pull-out state.

If the power battery is in the fully charged state or the pull-out state, the charging process is finished; and if the power battery is not in the fully charged state or the pull-out state, the BMS continues to execute step 406.

In embodiments of the present application, on the one hand, since normally the charging mode of the power battery is the charging mode selected by the user according to his or her own requirements in the current charging scenario, adjusting the charging current according to the negative electrode potential safety threshold determined by the charging mode can meet the charging requirements of users in different charging scenarios; on the other hand, adjusting the charging current for the power battery according to the negative electrode potential of the power battery and the negative electrode potential safety threshold can avoid the safety problem of the power battery caused by lithium ion aggregation and other problems, such as battery combustion or explosion, thus ensuring the safety performance of the power battery. Further, the above technical solution is implemented by software, that is, the purpose of ensuring the safety performance of the power battery and meeting the charging requirements of the user under different charging scenarios is achieved without increasing the hardware cost of the BMS.

The method embodiments of the present application have been described in detail above, and the apparatus embodiment of the present application will be described below. The apparatus embodiment corresponds to the method embodiments, so for the part not described in detail, reference can be made to the previous method embodiments, and the apparatus can implement any of the above methods that may be implemented.

Figure 5:
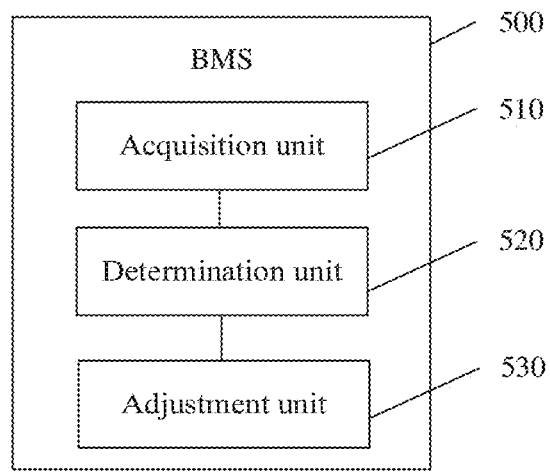
FIG. 5 is a schematic block diagram of a BMS of an embodiment of the present application.

FIG. 5 illustrates a schematic block diagram of a BMS 500 of an embodiment of the present application. This BMS 500 may perform the method 200 for charging a power battery of the above embodiment of the present application. As shown in FIG. 5, this BMS 500 may include:

an acquisition unit 510 for acquiring a charging mode of the power battery;

a determination unit 520 for determining a negative electrode potential safety threshold for the power battery according to the charging mode of the power battery;

the acquisition unit 510 being further used for acquiring a negative electrode potential of the power battery during a charging process for the power battery; and an adjustment unit 530 for adjusting a charging current for the power battery based on the negative electrode potential of the power battery and the negative electrode potential safety threshold.

Optionally, in an embodiment of the present application, the determination unit 520 is specifically used for: determining the negative electrode potential safety threshold for the power battery according to the charging mode of the power battery and according to the correspondence between charging modes and negative electrode potential safety thresholds.

Optionally, in an embodiment of the present application, the charging mode comprises at least a first charging mode or a second charging mode, wherein in the first charging mode, the charging current for the power battery is a first charging current, and in the second charging mode, the charging current for the power battery is a second charging current, the first charging current being greater than the second charging current, and the negative electrode potential safety threshold corresponding to the first charging mode being less than the negative electrode potential safety threshold corresponding to the second charging mode.

Optionally, in an embodiment of the present application, the determination unit 520 is specifically used for: determining the negative electrode potential safety threshold according to the charging mode of the power battery and a battery state parameter of the power battery, the battery state parameter comprising at least one of the state of charge (SOC), the temperature, and the state of health (SOH) of the power battery.

Optionally, in an embodiment of the present application, the battery state parameter of the power battery is a battery state parameter of the power battery before charging.

Optionally, in an embodiment of the present application, in the same charging mode, when the SOC of the power battery is in a first SOC interval, the negative electrode potential safety threshold is a first preset negative electrode potential safety threshold; and when the SOC of the power battery is in a second SOC interval, the negative electrode potential safety threshold is a second preset negative electrode potential safety threshold, wherein SOCs in the first SOC interval are less than SOCs in the second SOC interval, and the first preset negative electrode potential safety threshold is less than the second preset negative electrode potential safety threshold.

Optionally, in an embodiment of the present application, in the same charging mode, when the temperature of the power battery is in a first temperature interval, the negative electrode potential safety threshold is a third preset negative electrode potential safety threshold; and when the temperature of the power battery is in a second temperature interval, the negative electrode potential safety threshold is a fourth preset negative electrode potential safety threshold, wherein temperatures in the first temperature interval are less than temperatures in the second temperature interval, and the third preset negative electrode potential safety threshold is greater than the fourth preset negative electrode potential safety threshold.

Optionally, in an embodiment of the present application, in the same charging mode, when the SOH of the power battery is in a first SOH interval, the negative electrode potential safety threshold is a fifth preset negative electrode potential safety threshold; and when the SOH of the power battery is in a second SOH interval, the negative electrode potential safety threshold is a sixth preset negative electrode potential safety threshold, wherein SOHs in the first SOH interval are less than SOHs in the second SOH interval, and the fifth preset negative electrode potential safety threshold is greater than the sixth preset negative electrode potential safety threshold.

Optionally, in an embodiment of the present application, the adjustment unit 530 is specifically used for: adjusting the charging current from a first charging current to a second charging current if the negative electrode potential drops to the negative electrode potential safety threshold, the second charging current being less than the first charging current.

Optionally, in an embodiment of the present application, the adjustment unit 530 is specifically used for: adjusting the charging current from a first charging current to a third charging current if the negative electrode potential does not drop to the negative electrode potential safety threshold and a charging duration of the power battery is greater than a time threshold, the third charging current being greater than the first charging current.

It should be understood that this BMS 500 can implement the corresponding operations of the BMS in the method 200 and will not be repeated herein for brevity. Accordingly, this BMS 500 can achieve the same technical effect as the aforementioned method 200, which will not be described herein for the sake of brevity of content.

Figure 6:
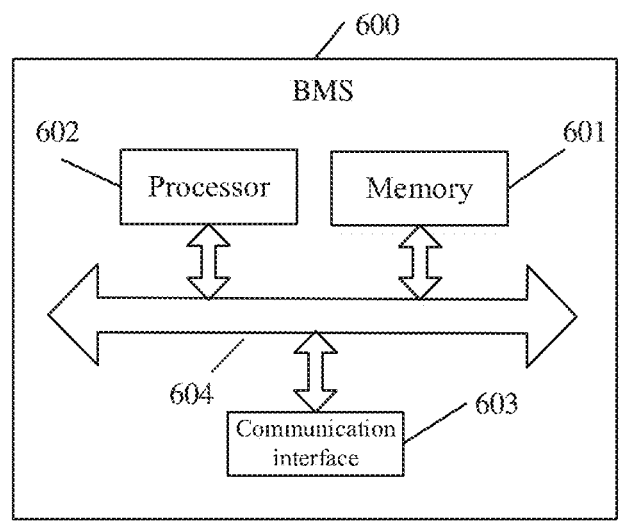
FIG. 6 is a schematic block diagram of a BMS of an embodiment of the present application.

FIG. 6 is a schematic diagram of the hardware structure of a BMS of embodiments of the present application. The BMS 600 includes a memory 601, a processor 602, a communication interface 603, and a bus 604. Among them, the memory 601, the processor 602, and the communication interface 603 are communicatively connected to each other via the bus 604.

The memory 601 may be a read-only memory (ROM), a static storage device, and a random access memory (RAM). The memory 601 may store a program, and when the program stored in the memory 601 is executed by the processor 602, the processor 602 and the communication interface 603 are used to perform the various steps of the method for charging a power battery of embodiments of the present application.

The processor 602 may employ a general purpose central processing unit (CPU), a microprocessor, an application specific integrated circuit (ASIC), a graphics processing unit (GPU) or one or more integrated circuits for executing the relevant programs, so as to implement the functions required to be performed by the units in the apparatus of embodiments of the present application, or to implement the method for charging a power battery of embodiments of the present application.

The processor 602 may also be an integrated circuit chip that has a processing capability for signals. During implementation, the various steps of the method for charging a power battery of embodiments of the present application may be accomplished by integrated logic circuitry of the hardware in the processor 602 or by instructions in the form of software.

The above processor 602 may also be a general purpose processor, a digital signal processor (DSP), an ASIC, a field programmable gate array (FPGA) or other programmable logic devices, discrete gates or transistor logic devices, discrete hardware components. The methods, steps, and logical block diagrams as disclosed in embodiments of the present application can be implemented or performed. The general purpose processor may be a microprocessor, or the processor may also be any conventional processor, etc. The steps of the method disclosed in conjunction with the embodiments of the present application can be directly embodied as being performed by the hardware processor or being performed with a combination of hardware and software modules in the processor. The software module may be located in a random access memory, a flash memory, a read-only memory, a programmable read-only memory or an electrically rewritable programmable memory, a register, and other storage media well established in the art. The storage medium is located in the memory 601 and the processor 602 reads the information in the memory 601 and, in combination with its hardware, performs the functions required to be performed by the units included in the BMS of embodiments of the present application, or performs the method for charging a power battery of embodiments of the present application.

The communication interface 603 uses, for example, but not limited to, a transceiving apparatus such as a transceiver to enable communication between the BMS 600 and other devices or communication networks. For example, the BMS 600 can send charging request information to the charging pile via the communication interface 603.

The bus 604 may include a pathway for transmitting information between various components (e.g., the memory 601, the processor 602, and the communication interface 603) of the BMS 600.

It should be noted that although the BMS 600 described above illustrates only the memory, the processor, and the communication interface, during specific implementation, it should be understood by those skilled in the art that the BMS 600 may also include other devices necessary to achieve normal operation. Meanwhile, depending on the specific needs, those skilled in the art should understand that the BMS 600 may also include hardware devices that implement other additional functions. Further, it should be understood by those skilled in the art that the BMS 600 may also include only those devices necessary to implement embodiments of the present application, and need not include all of the devices shown in FIG. 6.

Embodiments of the present application also provide a computer-readable storage medium storing program code for execution by a device, the program code comprising instructions for performing the steps in the method for charging a power battery described above.

Embodiments of the present application further provide a computer program product comprising a computer program stored on a computer-readable storage medium, wherein the computer program comprising program instructions that, when executed by a computer, cause the computer to perform the method for charging a power battery as described above.

The computer-readable storage medium described above may be a transitory computer-readable storage medium or a non-transitory computer-readable storage medium.

It should be understood that in the various embodiments of the present application, the values of the serial numbers of the processes does not imply the order of execution, and the order in which the processes are performed shall be determined by their functions and intrinsic logic, and shall not constitute any limitation to the implementation process of the embodiments of the present application.

It should also be understood that the various implementations described in this specification may be implemented individually or in combination, which is not limited in the embodiments of the present application.

Although the present application has been described with reference to the preferred embodiments, various improvements can be made thereto and components thereof can be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A method for charging a power battery, wherein the method is applied to a battery management system for the power battery, the method comprising:
   acquiring a charging mode of the power battery;
   determining a negative electrode potential safety threshold for the power battery according to the charging mode of the power battery;
   acquiring a negative electrode potential of the power battery during a charging process for the power battery; and
   adjusting a charging current for the power battery based on the negative electrode potential of the power battery and the negative electrode potential safety threshold;
   wherein said adjusting a charging current for the power battery based on the negative electrode potential of the power battery and the negative electrode potential safety threshold comprises:
   adjusting the charging current from a first charging current to a third charging current if the negative electrode potential does not drop to the negative electrode potential safety threshold and a charging duration of the power battery is greater than a time threshold, the third charging current being greater than the first charging current, and
   wherein said adjusting a charging current for the power battery based on the negative electrode potential of the power battery and the negative electrode potential safety threshold comprises:
   adjusting the charging current from a first charging current to a second charging current if the negative electrode potential drops to the negative electrode potential safety threshold, the second charging current being less than the first charging current.

2. The method according to claim 1, wherein said determining a negative electrode potential safety threshold for the power battery according to the charging mode of the power battery comprises:
   determining the negative electrode potential safety threshold for the power battery according to the charging mode of the power battery and according to the correspondence between charging modes and negative electrode potential safety thresholds.

3. The method according to claim 1, wherein the charging mode comprises at least a first charging mode or a second charging mode,
   wherein in the first charging mode, the charging current for the power battery is a first charging current, and in the second charging mode, the charging current for the power battery is a second charging current, the first charging current being greater than the second charging current, and the negative electrode potential safety threshold corresponding to the first charging mode being less than the negative electrode potential safety threshold corresponding to the second charging mode.

4. The method according to claim 1, wherein said determining a negative electrode potential safety threshold for the power battery according to the charging mode of the power battery comprises:
   determining the negative electrode potential safety threshold according to the charging mode of the power battery and a battery state parameter of the power battery, the battery state parameter comprising at least one of the state of charge (SOC), the temperature, and the state of health (SOH) of the power battery.

5. The method according to claim 4, wherein the battery state parameter of the power battery is a battery state parameter of the power battery before charging.

6. The method according to claim 4, wherein in the same charging mode, when the SOC of the power battery is in a first SOC interval, the negative electrode potential safety threshold is a first preset negative electrode potential safety threshold; and
when the SOC of the power battery is in a second SOC interval, the negative electrode potential safety threshold is a second preset negative electrode potential safety threshold,
wherein SOCs in the first SOC interval are less than SOCs in the second SOC interval, and the first preset negative electrode potential safety threshold is less than the second preset negative electrode potential safety threshold.

7. The method according to claim 4, wherein in the same charging mode, when the temperature of the power battery is in a first temperature interval, the negative electrode potential safety threshold is a third preset negative electrode potential safety threshold; and
when the temperature of the power battery is in a second temperature interval, the negative electrode potential safety threshold is a fourth preset negative electrode potential safety threshold,
wherein temperatures in the first temperature interval are less than temperatures in the second temperature interval, and the third preset negative electrode potential safety threshold is greater than the fourth preset negative electrode potential safety threshold.

8. The method according to claim 4, wherein in the same charging mode, when the SOH of the power battery is in a first SOH interval, the negative electrode potential safety threshold is a fifth preset negative electrode potential safety threshold; and
when the SOH of the power battery is in a second SOH interval, the negative electrode potential safety threshold is a sixth preset negative electrode potential safety threshold,
wherein SOHs in the first SOH interval are less than SOHs in the second SOH interval, and the fifth preset negative electrode potential safety threshold is greater than the sixth preset negative electrode potential safety threshold.

9. A battery management system for a power battery, comprising circuitry configured to:
acquire a charging mode of the power battery;
determine a negative electrode potential safety threshold for the power battery according to the charging mode of the power battery;
acquire a negative electrode potential of the power battery during a charging process for the power battery; and
adjust a charging current for the power battery based on the negative electrode potential of the power battery and the negative electrode potential safety threshold;
wherein the circuitry is further configured to adjust the charging current from a first charging current to a third charging current if the negative electrode potential does not drop to the negative electrode potential safety threshold and a charging duration of the power battery is greater than a time threshold, the third charging current being greater than the first charging current, and
wherein the circuitry is further configured to adjust the charging current from a first charging current to a second charging current if the negative electrode potential drops to the negative electrode potential safety threshold, the second charging current being less than the first charging current.

10. The battery management system according to claim 9, wherein the circuitry is further configured to:
determine the negative electrode potential safety threshold for the power battery according to the charging mode of the power battery and according to the correspondence between charging modes and negative electrode potential safety thresholds.

11. The battery management system according to claim 9, wherein the charging mode comprises at least a first charging mode or a second charging mode,
wherein in the first charging mode, the charging current for the power battery is a first charging current, and in the second charging mode, the charging current for the power battery is a second charging current, the first charging current being greater than the second charging current, and the negative electrode potential safety threshold corresponding to the first charging mode being less than the negative electrode potential safety threshold corresponding to the second charging mode.

12. The battery management system according to claim 9, wherein the circuitry is further configured to:
determine the negative electrode potential safety threshold according to the charging mode of the power battery and a battery state parameter of the power battery, the battery state parameter comprising at least one of the state of charge (SOC), the temperature, and the state of health (SOH) of the power battery.

13. The battery management system according to claim 12, wherein in the same charging mode, when the SOC of the power battery is in a first SOC interval, the negative electrode potential safety threshold is a first preset negative electrode potential safety threshold; and
when the SOC of the power battery is in a second SOC interval, the negative electrode potential safety threshold is a second preset negative electrode potential safety threshold,
wherein SOCs in the first SOC interval are less than SOCs in the second SOC interval, and the first preset negative electrode potential safety threshold is less than the second preset negative electrode potential safety threshold.

14. The battery management system according to claim 12, wherein in the same charging mode, when the temperature of the power battery is in a first temperature interval, the negative electrode potential safety threshold is a third preset negative electrode potential safety threshold; and
when the temperature of the power battery is in a second temperature interval, the negative electrode potential safety threshold is a fourth preset negative electrode potential safety threshold,
wherein temperatures in the first temperature interval are less than temperatures in the second temperature interval, and the third preset negative electrode potential safety threshold is greater than the fourth preset negative electrode potential safety threshold.

15. The battery management system according to claim 12, wherein in the same charging mode, when the SOH of the power battery is in a first SOH interval, the negative electrode potential safety threshold is a fifth preset negative electrode potential safety threshold; and when the SOH of the power battery is in a second SOH interval, the negative electrode potential safety threshold is a sixth preset negative electrode potential safety threshold, wherein SOHs in the first SOH interval are less than SOHs in the second SOH interval, and the fifth preset negative electrode potential safety threshold is greater than the sixth preset negative electrode potential safety threshold.

16. A battery management system for a power battery, comprising a processor and a memory, wherein the memory is used for storing a computer program, and the processor is configured to invoke the computer program to execute the method for charging a power battery according to claim 1.

* * * * *